(12) United States Patent
Tang et al.

(10) Patent No.: US 8,607,037 B2
(45) Date of Patent: Dec. 10, 2013

(54) PRE-INSTALLATION ENVIRONMENT USED BY OPERATING SYSTEMS

(75) Inventors: Jian Tang, Shenzhen (CN); Heng-Liang Gao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 267 days.

(21) Appl. No.: 13/153,750

(22) Filed: Jun. 6, 2011

(65) Prior Publication Data

US 2012/0124352 A1    May 17, 2012

(30) Foreign Application Priority Data

Nov. 12, 2010 (CN) .......................... 2010 1 0541556

(51) Int. Cl.
*G06F 9/24* (2006.01)
(52) U.S. Cl.
USPC .................. 713/1; 713/2; 713/180; 713/182; 713/183; 726/3; 726/4; 726/17; 726/19

(58) Field of Classification Search
USPC ............... 713/1, 2, 180–183; 726/3, 4, 17, 19
See application file for complete search history.

(56) References Cited

U.S. PATENT DOCUMENTS

| | | | |
|---|---|---|---|
| 8,200,989 B2 * | 6/2012 | Kim .............................. | 713/193 |
| 8,402,554 B2 * | 3/2013 | Thomas et al. ................. | 726/29 |
| 2008/0010679 A1 * | 1/2008 | Kim et al. ........................ | 726/19 |
| 2008/0060056 A1 * | 3/2008 | Li et al. ............................. | 726/3 |
| 2009/0125725 A1 * | 5/2009 | Kim .............................. | 713/184 |
| 2012/0084833 A1 * | 4/2012 | Thomas et al. ................... | 726/3 |
| 2012/0084835 A1 * | 4/2012 | Thomas et al. ................... | 726/3 |

* cited by examiner

*Primary Examiner* — Abdelmoniem Elamin
(74) *Attorney, Agent, or Firm* — Altis Law Group, Inc.

(57) ABSTRACT

A pre-installation environment used by an operating system includes a pre-installation kit, a running unit, and a write inhibiting unit. The running unit is used for running the pre-installation kit, and generating an inhibiting signal when running to call the executable files for configuring network environment. The write inhibiting unit is used for inhibiting information generated by running the executable files from being written into a log file in response to the inhibiting signal.

14 Claims, 1 Drawing Sheet

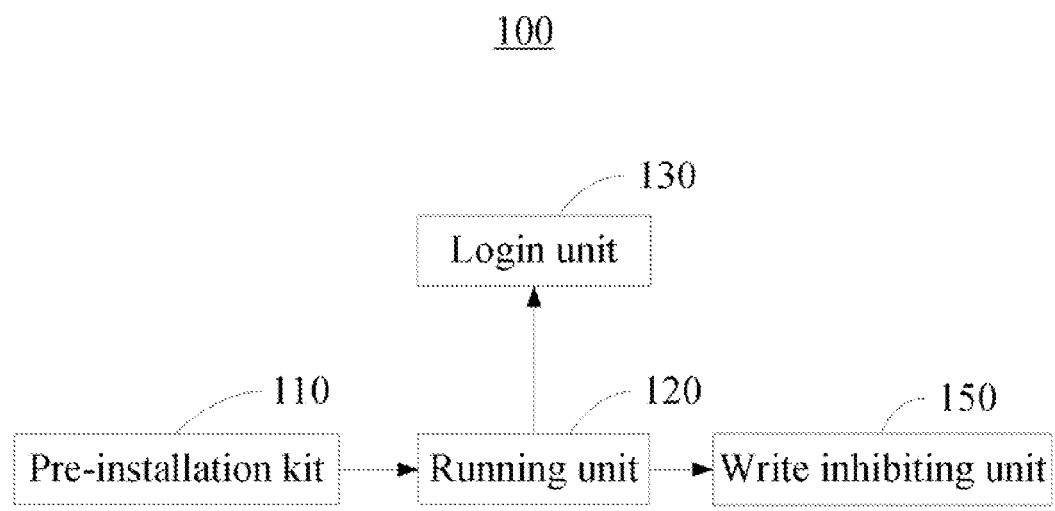

PRE-INSTALLATION ENVIRONMENT USED BY OPERATING SYSTEMS

BACKGROUND

1. Technical Field

The present disclosure relates to pre-installations; and particularly to a pre-installation environment used by an operating system.

2. Description of Related Art

A WINDOWS operating system often uses a WINDOWS pre-installation environment (hereinafter "WINDOWS PE") with a WINDOWS OEM pre-installation kit (hereinafter "WINDOWS OPK"). However, the WINDOWS PE often enters the text mode user interface after inputting the user name and password manually. Furthermore, information, generated by running the two executable files Factory.exe and Netcfg.exe to configure the network environment, is written into the log file Setupapi.log, thus WINDOWS PE starts slow.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the view.

The FIGURE is a block diagram of a pre-installation environment used by an operating system in accordance with an embodiment.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Referring to the FIGURE, a pre-installation environment 100 used by an operating system includes a pre-installation kit 110, a running unit 120, a login unit 130, and a write inhibiting unit 150. In the embodiment, the operating system is WINDOWS, the pre-installation environment 100 is WINDOWS PE, and the pre-installation kit 110 is WINDOWS OPK.

The running unit 120 is used for running the pre-installation kit 110. A login signal is generated when the pre-installation kit 110 is run to prompt a user to login in the text mode user interface of the pre-installation environment 100; and an inhibiting signal is generated when the pre-installation kit 110 is run to call executable files for configuring the network environment. In the embodiment, the executable files are factory.exe and netcfg.exe.

The login unit 130 is used for amending script files in response to the login signal to automatically input the user name and password, thus the user name and password do not need to be repeatedly inputted manually. In the embodiment, the login unit 130 automatically inputs the user name and password by adding first codes into all script files in the directory of RemoteInstall\OSChooser such as welcome.osc, and adding second codes into the script file login.osc. The first codes are META ACTION=AUTOENTER. The second codes are VALUE=Administrator and VALUE=Password.

The amended script file welcome.osc refers to third codes, and others script files needed to be added the first codes refers to the amended script file welcome.osc. The third codes are as follows:

---

```
[Start of code]
<OSCML>
<META KEY=ENTER HREF="LOGIN">
<META KEY=F3 ACTION="REBOOT">
<META KEY=ESC HREF="LOGIN">
<META KEY=F1 HREF="LOGIN">
<META ACTION=AUTOENTER>
<TITLE> Client Installation Wizard Welcome</TITLE>
<FOOTER> [ENTER] continue </FOOTER>
<BODY left=5 right=75>
<BR>
<BR>
<BR>
Welcome to the Client Installation wizard. This wizard helps you quickly and easily set up a new operating system on your computer. You can also use this wizard to keep your computer up-to-date and to troubleshoot computer hardware problems.
<BR>
<BR>
In the wizard, you are asked to use a valid user name, password, and domain name to log on to the network. If you do not have this information, contact your network administrator before continuing.
</BODY>
</OSCML>
[End of code]
```

---

Furthermore, the amended script file login.osc refers to fourth codes. The fourth codes are as follows:

---

```
[Start of code]
<OSCML>
<TITLE> Client Installation Wizard Logon</TITLE>
<FOOTER> [ENTER] continue [ESC] clear [F1] help [F3] restart computer</FOOTER>
<META KEY=F3 ACTION="REBOOT">
<META KEY=F1 HREF="LOGINHLP">
<META KEY=ESC HREF="LOGIN">
<META ACTION="LOGIN">
<META ACTION=AUTOENTER>
<BODY left=5 right=75>
<BR>
<BR>
Type a valid user name, password, and domain name. You may use the Internet-style logon.
    format (for example: Username@Company.com).
<BR>
```

-continued

```
    <BR>
    <BR>
    <FORM ACTION="CHOICE">
       User name: <INPUT NAME="USERNAME" value=administrator
MAXLENGTH=255>
       Password: <INPUT NAME="*PASSWORD"
TYPE=PASSWORD value=Password MAXLENGTH=20><BR>
      Domain name: <INPUT NAME="USERDOMAIN"
VALUE=%SERVERDOMAIN% MAXLENGTH=255>
      <INPUT NAME="NTLMV2Enabled" VALUE=%NTLMV2Enabled%
MAXLENGTH=255 type=VARIABLE>
      <INPUT NAME="ServerUTCFileTime" VALUE=%ServerUTCFileTime%
MAXLENGTH=255 type=VARIABLE>
    </FORM>
    <BR>
    <BR>
    <BR>
    Press the TAB key to move between the User name, Password, and Domain name
fields.
    <BR>
    <BR>
    You are connected to %SERVERNAME%
    </BODY>
    </OSCML>
    [End of code]
```

The write inhibiting unit 150 is used for inhibiting information, generated by running the executable files, from being written into a log file Setupapi.log in response to the inhibiting signal, thus the pre-installation environment 100 starts quickly. In the embodiment, the write inhibiting unit 150 inhibits the running information from being written into the log file Setupapi.log by setting the log file Setupapi.log as a read-only file. In other embodiments, the write inhibiting unit 150 also can inhibit the running information from being written into the log file Setupapi.log by adding a new input item loglevel into the pre-installation environment configuration file of the registry, and then setting the value of the new input item loglevel as 0x00000101.

It is to be understood, however, that even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A pre-installation environment used by an operating system, comprising:
   a pre-installation kit;
   a running unit for running the pre-installation kit, and generating an inhibiting signal when running to call executable files for configuring a network environment; and
   a write inhibiting unit for inhibiting information, generated by running the executable files, from being written into a log file in response to the inhibiting signal so that the pre-installation environment starts quickly.

2. The pre-installation environment according to claim 1, wherein the write inhibiting unit inhibits the running information from being written into the log file by setting the log file as a read-only file.

3. The pre-installation environment according to claim 1, wherein the write inhibiting unit inhibits the running information from being written into the log file by adding a new input item into the pre-installation environment configuration file of the registry, and then setting the value of the new input item as 0x00000101.

4. The pre-installation environment according to claim 1, wherein the log file is Setupapi.log, and the executable files are factory.exe and netcfg.exe.

5. The pre-installation environment according to claim 1, wherein the operating system is WINDOWS, the pre-installation environment is WINDOWS PE, and the pre-installation kit is WINDOWS OPK.

6. The pre-installation environment according to claim 1, further comprising a login unit, the running unit being further used for generating a login signal when running to prompt a user to login in the text mode user interface of the pre-installation environment; the login unit being used for amending script files in response to the login signal to automatically input the user name and password.

7. The pre-installation environment according to claim 6, wherein the login unit automatically inputs the user name and password by adding first codes into all script files in the directory of RemoteInstall\OSChooser, and adding second codes into the script file login.osc; the first codes are META ACTION=AUTOENTER, and the second codes are VALUE=Administrator and VALUE=Password.

8. A pre-installation environment used by an operating system, comprising:
   a pre-installation kit;
   a running unit for running the pre-installation kit, and generating a login signal when running to prompt a user to login in the text mode user interface of the pre-installation environment; and
   a login unit for amending script files in response to the login signal to automatically input the user name and password.

9. The pre-installation environment according to claim 8, wherein the login unit automatically inputs the user name and password by adding first codes into all script files in the directory of RemoteInstall\OSChooser, and adding second codes into the script file login.osc; the first codes are META ACTION=AUTOENTER, and the second codes are VALUE=Administrator and VALUE=Password.

10. The pre-installation environment according to claim 8, wherein the operating system is WINDOWS, the pre-installation environment is WINDOWS PE, and the pre-installation kit is WINDOWS OPK.

11. The pre-installation environment according to claim 8, further comprising a write inhibiting unit, the running unit being further used for generating an inhibiting signal when running to call executable files for configuring a network environment; the write inhibiting unit being used for inhibiting information, generated by running the executable files, from being written into a log file in response to the inhibiting signal so that the pre-installation environment starts quickly.

12. The pre-installation environment according to claim 11, wherein the write inhibiting unit inhibits the running information from being written into the log file by setting the log file as a read-only file.

13. The pre-installation environment according to claim 11, wherein the write inhibiting unit inhibits the running information from being written into the log file by adding a new input item into the pre-installation environment configuration file of the registry, and then setting the value of the new input item as 0×00000101.

14. The pre-installation environment according to claim 11, wherein the log file is Setupapi.log, and the executable files are factory.exe and netcfg.exe.

* * * * *